United States Patent
Veerasamy (12)

(10) Patent No.: US 6,208,865 B1
(45) Date of Patent: Mar. 27, 2001

(54) CELLULAR TELEPHONE SYSTEM WHICH INCREASES EFFICIENCY OF RESERVED CHANNEL USAGE

(75) Inventor: Jey Veerasamy, Richardson, TX (US)

(73) Assignee: Samsung Electronics Co., LTD (KR)

( * ) Notice: Subject to any disclaimer, the term of this patent is extended or adjusted under 35 U.S.C. 154(b) by 0 days.

(21) Appl. No.: 09/131,309

(22) Filed: Aug. 7, 1998

(51) Int. Cl.[7] .............................. H04Q 7/28; H04Q 7/38
(52) U.S. Cl. .................... 455/450; 455/512; 455/509; 455/527; 455/517; 455/426; 455/453; 455/464
(58) Field of Search ..................................... 455/512, 509, 455/522, 450, 515, 527, 517, 520, 521, 426, 524, 453, 464

(56) References Cited

U.S. PATENT DOCUMENTS

| | | | |
|---|---|---|---|
| 5,497,504 | * 3/1996 | Acampora et al. | 455/512 |
| 5,574,977 | * 11/1996 | Joseph et al. | 455/512 |
| 5,615,249 | * 3/1997 | Solondz | 455/512 |
| 5,864,762 | * 1/1999 | Childress et al. | 455/509 |

* cited by examiner

*Primary Examiner*—Fan Tsang
*Assistant Examiner*—Keith Ferguson

(57) ABSTRACT

A wireless communication system, such as a cellular communication system prioritizes calls to have a low, regular or high priority. The communication channels provided by a base station are divided into regular channels and reserved channels. All calls are connected on regular channels until the regular channels are all full. When the regular channels are all full, then regular priority calls are connected as low priority calls or not at all. If a regular priority call is connected as a low priority call it is connected via a reserved channel. Once all the reserved channels are full, then a high priority call is attempted to be connected by dropping a low priority call and using the reserved channel that the low priority call was using.

9 Claims, 2 Drawing Sheets

CELLULAR TELEPHONE SYSTEM WHICH INCREASES EFFICIENCY OF RESERVED CHANNEL USAGE

BACKGROUND OF THE PRESENT INVENTION

1. Field of the Invention

The present invention relates to cellular communication networks, and more specifically to cellular communication network which prioritize access to channel assignments.

2. Background and Objects of the Present Invention

The capacity of a wireless or cellular communication system and its ability to cope with a given traffic density are related in that a wireless or cellular (hereinafter "wireless") system must be able to accommodate the peak traffic density that is likely to be encountered. The inability of a wireless system to deal with maximum communication traffic is sometimes referred to as the "capacity limit". A capacity limit may be different for different portions of a cellular system depending on a variety of variables. There are, at present, three factors that limit the capacity provided by a wireless system and they are:

1. the total amount of spectrum available;
2. the co-channel interference level that can be tolerated by the radio equipment for acceptable call quality; and
3. the cell size, large or small, can be established.

The total amount of spectrum available can be limited by, among other things, governmental regulations and competing wireless devices and services. The use of digital wireless technology over analog wireless technology has decreased the spacing between channels and increased the number of channels available. Increasing system capacity by reducing the channel spacing lowers the protection against the co-channel interference and thereby necessitating a higher integer cell repeat pattern. The capacity gain achieved by a reduction of channel spacing is therefore offset by an increase in cluster size.

Decreasing cell size increases capacity of networks but adds expense and creates the problem of finding cell sites at precise locations in urban environments where site spacing is the closest an the cost is at a premium. Of course, site location inaccuracy inevitably leads to a dilution of the potential increase in capacity of a reduced cell size.

At subscriber demand increases, it continues to be necessary to explore additional methods of increasing capacity. One technique explored has been the use of overlaid cells, which allows the reuse of frequencies at each site. The overlaid cells operate provided that they are only used by mobile phones/devices within a smaller radius than that of the macrocell, thereby adding additional capacity at the center of the cell. The overlaid cells use frequency groups that are already allocated to normal adjacent macrocells. The reuse distance for the overlaid cell appropriate to a seven-cell cluster can thus be maintained, and hence the quality of service is approximately the same as that of the main cell plan.

Inevitably, there is a price to pay for such improvements; in the case of overlay cells, the system complexity is greatly increased. Software is required in the base station to recognize mobile phones that access the site with a strong signal level; these mobile phones can then be allocated to channels in the overlaid cell instead of the macrocell base on the assumption that they are close to the base station. The macrocells are reserved for weaker signals which probably originate from more distance mobile phones. Furthermore, the added problem of intracell handover is added making the system even more complex.

Economically speaking, there is a motivation to handle extremely high capacity situations that occur from time to time without requiring each cell to have the electronic connection capacity to handle a high/peak capacity when usually there is not a high/peak capacity situation. There is a need for a system that can handle an over capacity or high capacity situation which drops the least number of calls. There is a need for a wireless telecommunication system than can handle peak moments and decide how to prioritize calls when the communication traffic exceeds that of a cell's capacity.

What is needed is a system adapted to handle the growing use and demand of a cellular channels without degrading the system by adding too much complexity, and that can maintain customer satisfaction by not dropping a customer's call for seemingly no reason. Furthermore, such a technique for increasing the efficiency of a wireless system should further optimize virtually any wireless system (digital or analog) by utilizing reserved channels without disabling a priority user from utilizing such a reserved channel when necessary. What is also needed is a wireless system to prioritize calls when the available channels are being heavily utilized.

SUMMARY OF THE INVENTION

An exemplary embodiment of the present invention utilizes a scheme of prioritizing wireless communication channels. The scheme optimizes the use of wireless channels while minimizing the dropping of high priority calls due to a lack of reserved channels.

An exemplary wireless communication system would inform a mobile communication device user that their call may be "dropped" or disconnected if the user's communication is prioritized as a low or regular communication and/or the communication is being performed on a reserved channel.

A wireless communication system, such as a cellular communication system prioritizes calls to have a low, regular or high priority. The communication channels provided by a base station are divided into regular channels and reserved channels. All calls are connected on regular channels until the regular channels are all full. When the regular channels are all full, then regular priority calls are connected as low priority calls or not at all. If a regular priority call is connected as a low priority call it is connected via a reserved channel. Once all the reserved channels are full, then a high priority call is attempted to be connected by dropping a low priority call and using the reserved channel that the low priority call was using.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

Various objects and advantages of this invention will become apparent and more readily appreciated from the following description of the presently preferred exemplary embodiments, taken in conjunction with the accompanying drawings, of which.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
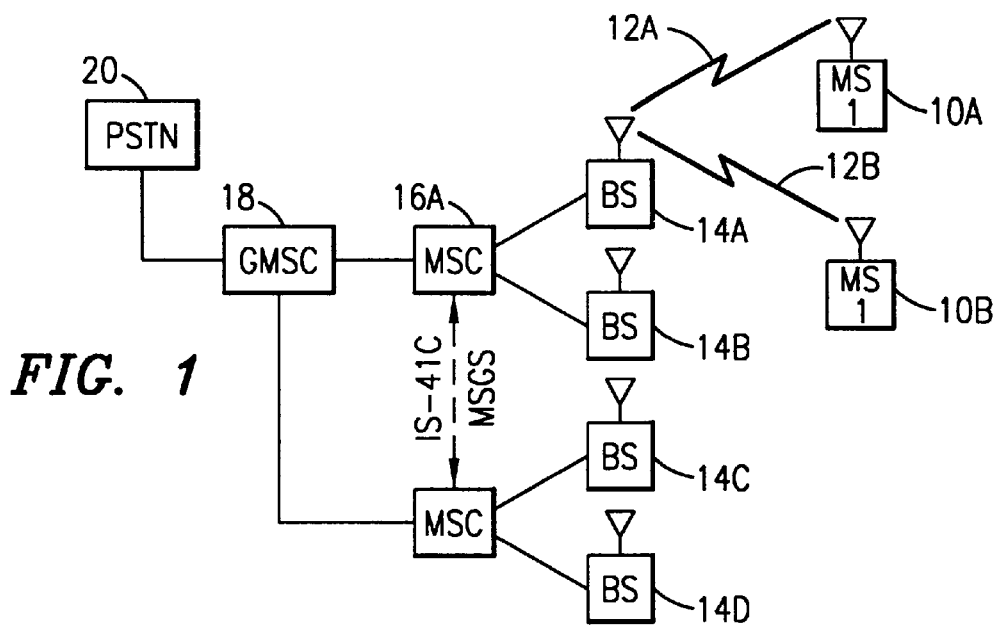
FIG. 1 is a general block diagram of a wireless or cellular communication system.

When a user of a wireless or cellular mobile subscriber unit or device (ex: a cellular phone) uses the mobile subscriber unit, one of, for example 21 to 333 channels are selected by a base station for carrying the call. Generally, the strongest channel signal from a base station is selected. Referring to FIG. 1, a mobile subscriber unit 10A places a call via a channel 12A to a base station 14A. Generally, when originating a call the user places a number into an origination register of the mobile unit 10A. The user may check to make sure the number is correct and then press the send button. A request for service is sent on a selected set-up channel by the mobile unit 10A to the base station 14A. The base station 14A then sends a request to the mobile switching center 16A. The mobile switching center 16A may be responsible for handling the switching of calls to and from a plurality of base stations (14A, 14B . . . ).

At some point in time, a second mobile device 10B may need to communicate via a second channel 12B associated with the same base station 14A that the first mobile device 10A is communicating with. In fact, it is common that many mobile devices are communicating via the same base station simultaneously.

Multiple mobile switching centers ("MSC"s) may be connected to a gateway mobile switching center (GMSC) 18. A GMSC is generally used to connect communications from a mobile switching system to an outside switching system such as a public switch telephone network PSTN 18, or another type of communication system such as an internet system, video conferencing system, local area network, wide area network, or a private branch exchange.

As an increased number of mobile subscriber users begin to use their mobile phones and other mobile communication devices, there will become a need to prioritize access to the available channels at each base station. For example, if a base station 14A is equipped to handle 40 channels and there are 45 mobile communication devices attempting to communicate in the area serviced by the base station 14A, then at least a few mobile subscriber devices will be unable to make a call. The mobile subscribers are connected on a "first come first serve" basis by the base station. This technique will physically work fine, but customer satisfaction may drop due to the user not knowing whether a call will go through.

In the present exemplary embodiments, the calls from the mobile communication devices are prioritized. A technique for prioritizing the calls might be called Priority Access Channel Assignment (PACA). PACA is an important feature in a wireless network. The base station distinguished between a regular or high priority subscriber. The base station may also distinguish between a regular, high or low priority call. As the volume of calls increases on wireless networks and the cost for providing a wireless service decreases, the feature of prioritizing calls becomes more and more important to wireless service providers and the users.

In a nutshell, an exemplary embodiment or method of the present invention drops a regular or low priority call from a communication channel when there is no communication channel available for a high priority subscriber or call.

At this point it would be best to define a few terms that will be used in this description of the preferred exemplary embodiments:

1. Regular channels: Regular channels are communication channels provided by a base station that are not designated as reserved channels. Regular channels are used for the majority of calls.
2. Reserved channels: Reserved channels are used by high priority calls and low priority calls when there are no regular channels available. Reserved channels are also provided by a base station.
3. Regular calls: Regular calls (regular priority calls) are calls that are an origination or hand-off call that do not have any priority information associated with them. (They may be prioritized as regular priority).
4. High Priority Calls: High priority calls are given priority treatment compared to regular calls or low priority calls. A high priority call will utilize a regular channel unless all the regular channels are being used. If all the regular channels are used, then a high priority call will use one of the reserved channels.
5. Low Priority Calls: Low priority calls are calls wherein the user has allowed the call to be placed using a reserved channel. This may have been done due to the unavailability of a regular channel, or the user requested the use of a reserved channel and designated as a low priority call. A low priority call can be disconnected or "dropped" at any announced or unannounced moment due to a high priority call being made, by another user, which requires the use of the reserved channel that the low priority call is on.

Since maximizing the use of all channels used by a base station is important, the objective of prioritizing calls is to maximize the use of all channels in busy base station locations without degrading customer satisfaction. Thus, the exemplary embodiments should not drop a customer's call without the customer understanding why it occurred. The customer or user can designate himself as a high, low or regular priority user either at the beginning of each call of via the contract or service plan with the wireless communication provider.

If some channels are reserved for high priority calls, then total channel occupancy (and system throughput) decreases. The decrease in channel occupancy is particularly true when there are few or no high priority subscribers using the reserved channels, since the regular priority calls cannot be placed on the reserved channels.

Figure 2:
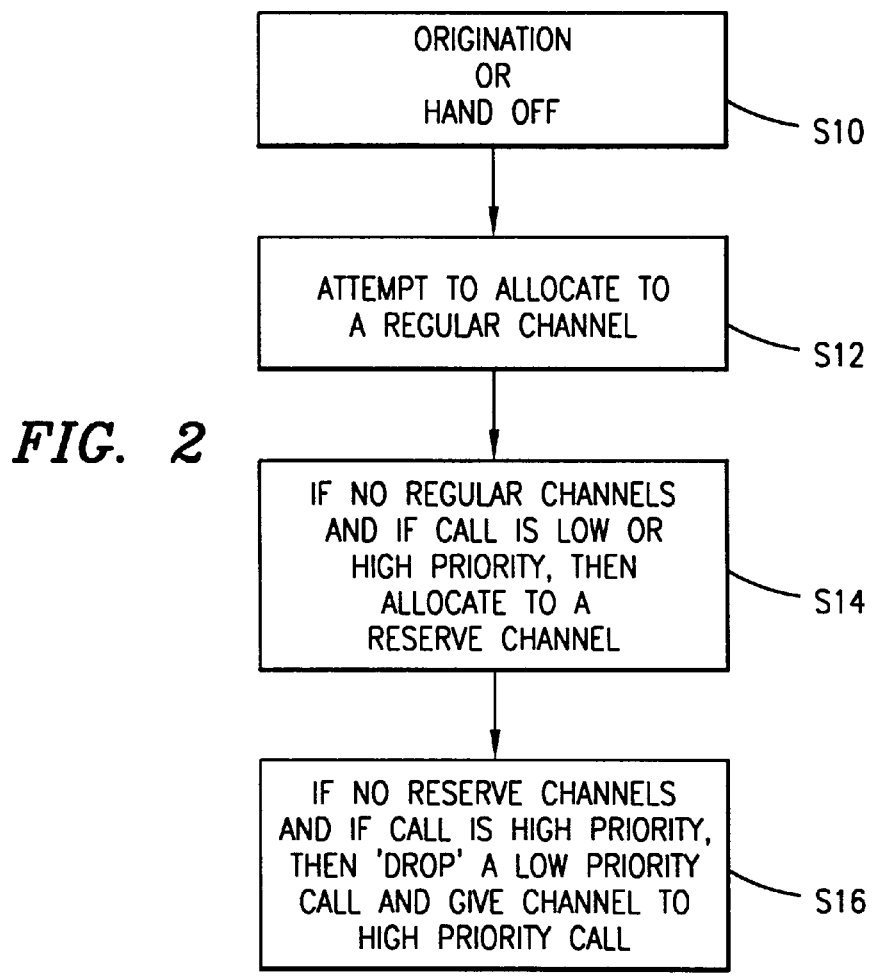
FIG. 2 depicts a flow chart indicating how calls of different priority are handled in an exemplary wireless communication system.

In the situation wherein a regular priority call is originated (or possibly handed off), and the connecting base station does not have any available regular priority channels available, the user may be asked via beep, tone message or orally whether he/she would accept a low priority connection. If the user accepts a low priority connection, the call could be dropped if a high priority user needs the channel. Referring to FIG. 2, in the flow chart at step S10, a call is either originated or handed off to a base station. At step S12, the base station or wireless system first attempts to treat the call as a regular priority call (regardless of whether it was handed off or originated as a high, regular or low priority call).

If no regular channels are available to connect the call, then in step S14 the wireless system determines whether to designate the call as a high or low priority call. In the case of either high or low priority, the call is connected using a reserved channel. The call is connected as a low priority call if the caller is a "regular customer" or has designated the call to be a low priority call. The reserve channel carries the low priority call until it is terminated, by the user, handed off to another base station, or dropped due to being "trumped" by a high priority call which needs the channel.

The available reserve channel is designated to carry a high priority call if the user is a high priority user or if the user specifically designated the call as a high priority call via special code or otherwise.

In step S16, if no reserved channels are available and the call is a high priority call, then a reserved channel carrying a low priority call will drop the low priority call (with or without notice to the low priority call user) and the high priority call will be connected using the channel.

This method and apparatus for prioritizing calls and reusing reserved channels should not be detrimental to customer satisfaction provided the regular subscriber is given the opportunity, either in the service contract or prior to connecting a call, to accept the risk of being dropped as a low priority call.

The user may designate to be connected as a low priority call prior to making the call. The user might dial a special feature code before dialing the phone number of the call destination to become a low priority call. For example, the user might dial 45#555-1212. Such a call could be billed to the user at a lower rate because the user is accepting the risk of being dropping.

Instead of requiring the user to dial a specific special feature code, the wireless network MSC or base station may instead provide the user with a warning that the call has gone through, but may be dropped at anytime due to a higher priority caller's needs. Another option is that the mobile subscriber's handset generates a tone or signal to indicate to the regular priority user that the call went through, but as a low priority call. Another option may be that the tone or signal in the handset requires a response or keypress from the user indicating that the user will accept that the call will go through as a low priority call.

Figure 3:
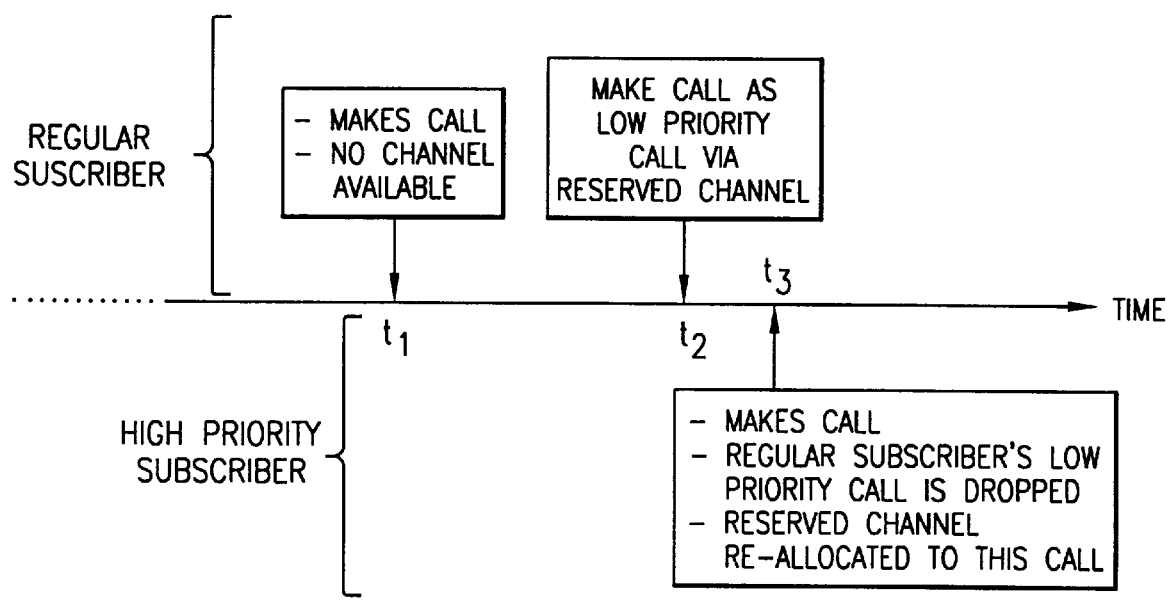
FIG. 3 depicts a time/event graph of an exemplary priority situation.

FIG. 3 depicts a time line depicting an exemplary scenario that an embodiment of the present invention handles. At time $t_1$ a regular subscriber makes a call, but all regular priority channels are being used. No regular channel is available, so the user or the user's wireless device requests that the call be set-up as a low priority call at time $t_2$. The low priority call is set up on a reserved channel. At time $t_3$, a high priority subscriber makes a call. The MSC or base station notes that no regular or reserved channels are available. Thus, the regular subscriber's low priority call is dropped from the needed reserve channel and the high priority call is connected.

It is noted that when a low priority call is handed off from one base station to another, it is preferable that an attempt is made to upgrade the low priority call to a regular priority call as shown in FIG. 2, step S12. Furthermore, the probability of a low priority call being dropped due to a need for the channel by a high priority call increases with the amount of call time. When the low priority call was specifically designated as a low priority call and the call is being handed off to another base station, the low priority information should preferably be conveyed with the call. This is especially important when a different billing rate is attached to a call specifically designated as a low priority call.

Furthermore, referring back to FIG. 2, priority information can be conveyed across internal wireless system components utilizing internal manufacturer system standards or standards-based messages. For example, IS-41 standards parameters OneTimeFeatureIndicator and PACA level can be enhanced to accommodate "low priority information." Intersystem communication between service providers may also be necessary to support low and high priority calls across a network or across various networks.

The present exemplary embodiments can be implemented via software, firmware and/or hardware mechanisms. Furthermore, the present exemplary prioritization of wireless communication calls can be implemented in virtually any digital wireless communication system such as CDMA, PCS, and D-AMPS. One of ordinary skill in the art of engineering, designing and programming a digital wireless communication system can readily utilize and implement an embodiment of the present invention.

As is clearly seen and understood, the present invention provides a significant improvement for handling heavy call traffic on a wireless communication system. The present invention provides an apparatus and method for providing a variety of priority access to channel assignments in a wireless communication system. The different priorities provide a wider variety of call types available to a user so that specific needs of an individual user can be better met. Furthermore channels reserved for high priority calls can still be utilized by regular priority customers for low priority "short" calls thereby increasing utilization of all available channels. The present invention is believed to be especially effective when configured and employed via the exemplary embodiments described herein, however those skilled in the art will readily recognize that numerous variations and substitutions may be made in the invention, inventive method, use, and configuration to achieve substantially the same results in substantially the same way as achieved by the exemplary embodiments and, in particular, the preferred embodiment described herein. Each of those variations is intended to be included in the description herein and forms a part of the present invention. The foregoing detailed description is, thus, to be clearly understood as being given by way of illustration and example only. The spirit and scope of the present invention being limited solely by the appended claims.

Although preferred embodiments of the system and method of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A wireless communication network comprising:
   a first mobile communication device having a regular priority;
   a second mobile communication device having a high priority;
   a first base station providing a plurality of regular priority channels and at least one high priority channel for communicating with said first mobile communication device, said base station providing said first mobile communication device a high priority channel when all of said plurality of regular priority channels are in use, wherein said base station drops communication with said first mobile communication device on said high priority channel and provides said second mobile communication device said high priority channel when there are no other channels available, and wherein said base station communicates to a user of said first mobile communication device that the first mobile communication device is being provided communication on a high priority channel that can be ended if a high priority mobile communication device needs to use said priority channel.

2. The wireless communication network of claim 1, wherein a user of said first mobile communication device, prior to being connected to any channel, communicates to the base station that the user would accept a high priority channel if all regular priority channels are in use.

3. The wireless communication network of claim 1, wherein the base station communicates to the user, prior to being connected to any channel, that the user has an option of one of terminating the call due the unavailability of regular priority channels and completing the call using a high priority channel.

4. The wireless communication network of claim 1, wherein said wireless communication network is a digital communication network.

5. The wireless communication network of claim 1, wherein the user is provided an opportunity by said wireless communication network to not be connected via said high priority channel.

6. A wireless communication system programmed to prioritize calls on a plurality of communication channels, said wireless communication system comprising:

a first base station having a first plurality of channels for communicating with a first wireless device and at least one first high priority channel for communicating with a second wireless device, said second wireless device being designated to communicate via high priority calls; and a second base station having a second plurality of channels for communicating with said first wireless device and at least one second high priority channel for communicating with said second wireless device , said first wireless device communicating with said first base station via at least one first high priority channel, and wherein said first base station communicates to a user of said first wireless device that the first wireless device is being provided communication on said at least one first high priority channel that can be ended if a high priority wireless device needs to use said at least one first high priority channel.

7. The wireless communication system of claim 6, wherein said first wireless device communicates with said first base station via said low priority call on said at least one high priority channel when all of said first plurality of channels are being utilized.

8. A method for prioritizing access to wireless communication channels in a wireless communication system, said wireless communication system comprising a base station for connecting calls between said base station and a first and second mobile communication device, said method for prioritizing comprising the steps of:

attempting to connect a regular priority call between said first mobile communication device and said base station;

determining that there are no regular priority channels available to carry a regular priority call;

informing the user of said first mobile communication device that there are no regular priority channels available and that the user can connect using a via low priority call;

initiating a low priority call via a reserved channel between said first mobile communication device and said base station; and informing a user of said first mobile communication device that the first first mobile communication device is being provided communication on said reserved channel that can be ended if a high priority priority mobile communication device device needs to use said reserved channel.

9. The method of claim 8, further comprising the steps of:

disconnecting the low priority call between said first mobile communication device and said base station in order to accommodate said second mobile communication device, said second mobile communication device being connected via said reserved channel as a high priority call.

* * * * *